United States Patent
Slinger et al.

(10) Patent No.: US 12,288,137 B2
(45) Date of Patent: Apr. 29, 2025

(54) PERFORMANCE PREDICTION USING DYNAMIC MODEL CORRELATION

(71) Applicant: BMC Software, Inc., Houston, TX (US)

(72) Inventors: Nigel Slinger, Los Gatos, CA (US); Wenjie Zhu, Dublin (IE); Roxanne Kallman, Ham Lake, MN (US); Catherine Drummond, Morgan Hill, CA (US); John Flournoy, Lago Vista, TX (US)

(73) Assignee: BMC Software, Inc., Houston, TX (US)

( * ) Notice: Subject to any disclaimer, the term of this patent is extended or adjusted under 35 U.S.C. 154(b) by 1184 days.

(21) Appl. No.: 16/949,477

(22) Filed: Oct. 30, 2020

(65) Prior Publication Data

US 2021/0383271 A1  Dec. 9, 2021

Related U.S. Application Data

(60) Provisional application No. 62/704,966, filed on Jun. 4, 2020.

(51) Int. Cl.
*G06N 20/00* (2019.01)

(52) U.S. Cl.
CPC .................................. *G06N 20/00* (2019.01)

(58) Field of Classification Search
CPC .. G06F 11/34; G06F 11/3447; G06F 11/3452; G06F 11/3466; G06N 3/08; G06N 20/00; G06N 20/20
See application file for complete search history.

(56) References Cited

U.S. PATENT DOCUMENTS

| | | | |
|---|---|---|---|
| 10,200,262 B1 | 2/2019 | Leverich et al. | |
| 2014/0180738 A1* | 6/2014 | Phillipps | G06N 20/10 705/7.38 |
| 2017/0329660 A1* | 11/2017 | Salunke | G06F 11/3409 |
| 2017/0330109 A1* | 11/2017 | Maughan | G06N 5/04 |
| 2018/0081912 A1* | 3/2018 | Suleiman | G06F 11/3452 |
| 2018/0107935 A1* | 4/2018 | Jeon | G08G 1/202 |
| 2018/0219889 A1 | 8/2018 | Oliner et al. | |
| 2020/0116522 A1* | 4/2020 | Paul | G01D 3/08 |
| 2021/0117869 A1* | 4/2021 | Plumbley | G06F 18/217 |

OTHER PUBLICATIONS

Extended European Search Report for European Application No. 21177730.5, mailed Nov. 12, 2021, 8 pages.

\* cited by examiner

*Primary Examiner* — Abdullah Al Kawsar
*Assistant Examiner* — Tewodros E Mengistu
(74) *Attorney, Agent, or Firm* — Brake Hughes Bellermann LLP

(57) ABSTRACT

A data stream of performance metrics characterizing a technology landscape may be received. From a plurality of performance prediction models and based on the performance metrics, a subset of performance prediction models may be selected. The subset of performance prediction models may be combined into a composite prediction model. The composite prediction model may be loaded into a model processor for scoring against the data stream of performance metrics to obtain a performance prediction for the technology landscape based thereon.

14 Claims, 13 Drawing Sheets

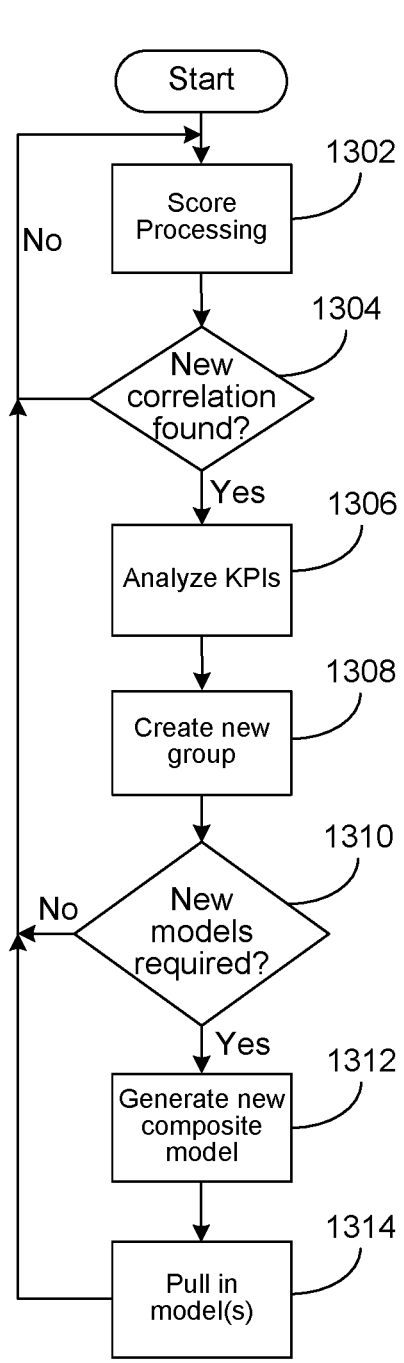
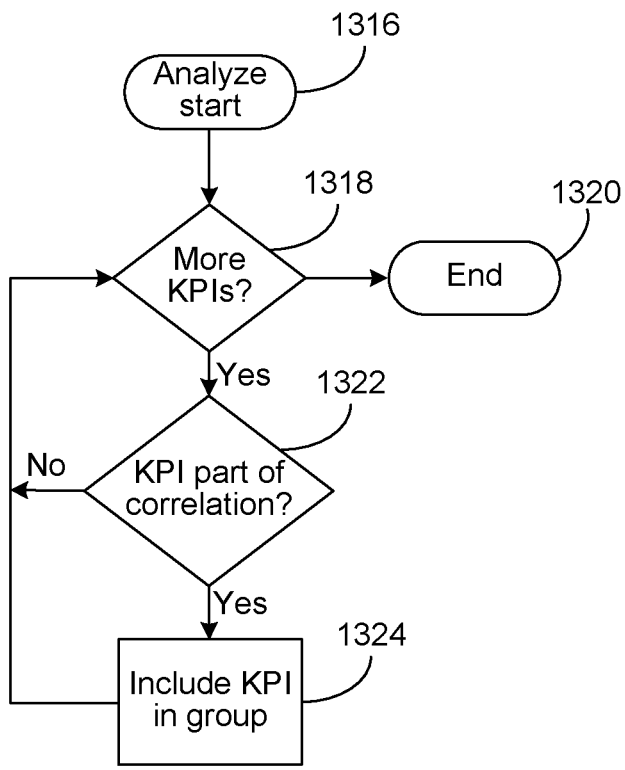
FIG. 13B
FIG. 13A

PERFORMANCE PREDICTION USING DYNAMIC MODEL CORRELATION

CROSS REFERENCE TO RELATED APPLICATION

This application claims priority to Provisional Application No. 62/704,966, titled PERFORMANCE PREDICTION USING DYNAMIC MODEL CORRELATION, filed on Jun. 4, 2020, the entire contents of which are incorporated herein by reference.

TECHNICAL FIELD

This description relates to performance prediction for technology landscapes.

BACKGROUND

Many companies and other entities have extensive technology landscapes, which include numerous Information Technology (IT) assets, including hardware and software. It is often required for such assets to perform at high levels of speed and reliability, while still operating in an efficient manner. For example, various types of computer systems are used by many entities to execute mission critical applications and high volumes of data processing, across many different workstations and peripherals.

Many different challenges may arise in such environments. For example, available resources (e.g., processing, memory, storage, or other resources) may be insufficient to perform desired tasks within a given timeframe. In other examples, hardware or software failures may result in an inability to provide desired results. These and other failures may be difficult to identify and remedy in a timely manner and may lead to corresponding failures in providing services to customers.

SUMMARY

According to one general aspect, a computer program product may be tangibly embodied on a non-transitory computer-readable storage medium and may include instructions that, when executed by at least one computing device, are configured to cause the at least one computing device to receive a data stream of performance metrics characterizing a technology landscape, and select, from a plurality of performance prediction models and based on the performance metrics, a subset of performance prediction models. The instructions, when executed by the at least one computing device, may be further configured to combine the subset of performance prediction models into a composite prediction model, and load the composite prediction model into a model processor for scoring against the data stream of performance metrics to obtain a performance prediction for the technology landscape based thereon.

According to another general aspect, a computer-implemented method may include receiving a data stream of performance metrics characterizing a technology landscape, and selecting, from a plurality of performance prediction models and based on the performance metrics, a subset of performance prediction models. The method may further include combining the subset of performance prediction models into a composite prediction model, and loading the composite prediction model into a model processor for scoring against the data stream of performance metrics to obtain a performance prediction for the technology landscape based thereon.

According to another general aspect, a system may include at least one memory including instructions, and at least one processor that is operably coupled to the at least one memory and that is arranged and configured to execute instructions. When executed, the instructions may cause the at least one processor to receive a data stream of performance metrics characterizing a technology landscape, and select, from a plurality of performance prediction models and based on the performance metrics, a subset of performance prediction models. When executed, the instructions may cause the at least one processor to combine the subset of performance prediction models into a composite prediction model, and load the composite prediction model into a model processor for scoring against the data stream of performance metrics to obtain a performance prediction for the technology landscape based thereon.

The details of one or more implementations are set forth in the accompanying drawings and the description below. Other features will be apparent from the description and drawings, and from the claims.

BRIEF DESCRIPTION OF THE DRAWINGS

FIG. 8 illustrates example data for a first example use case, in which a model is removed from loaded models.

FIG. 10 illustrates example data for a second example use case, in which model(s) are dynamically removed and added from loaded models.

FIG. 12 illustrates example data for a third example use case, in which a new model is added to a model store, and then included in the loaded models when needed.

FIG. 13A is a first flowchart illustrating the example of FIG. 12.

FIG. 13B is a second flowchart illustrating the example of FIG. 12.

DETAILED DESCRIPTION

Figure 1:
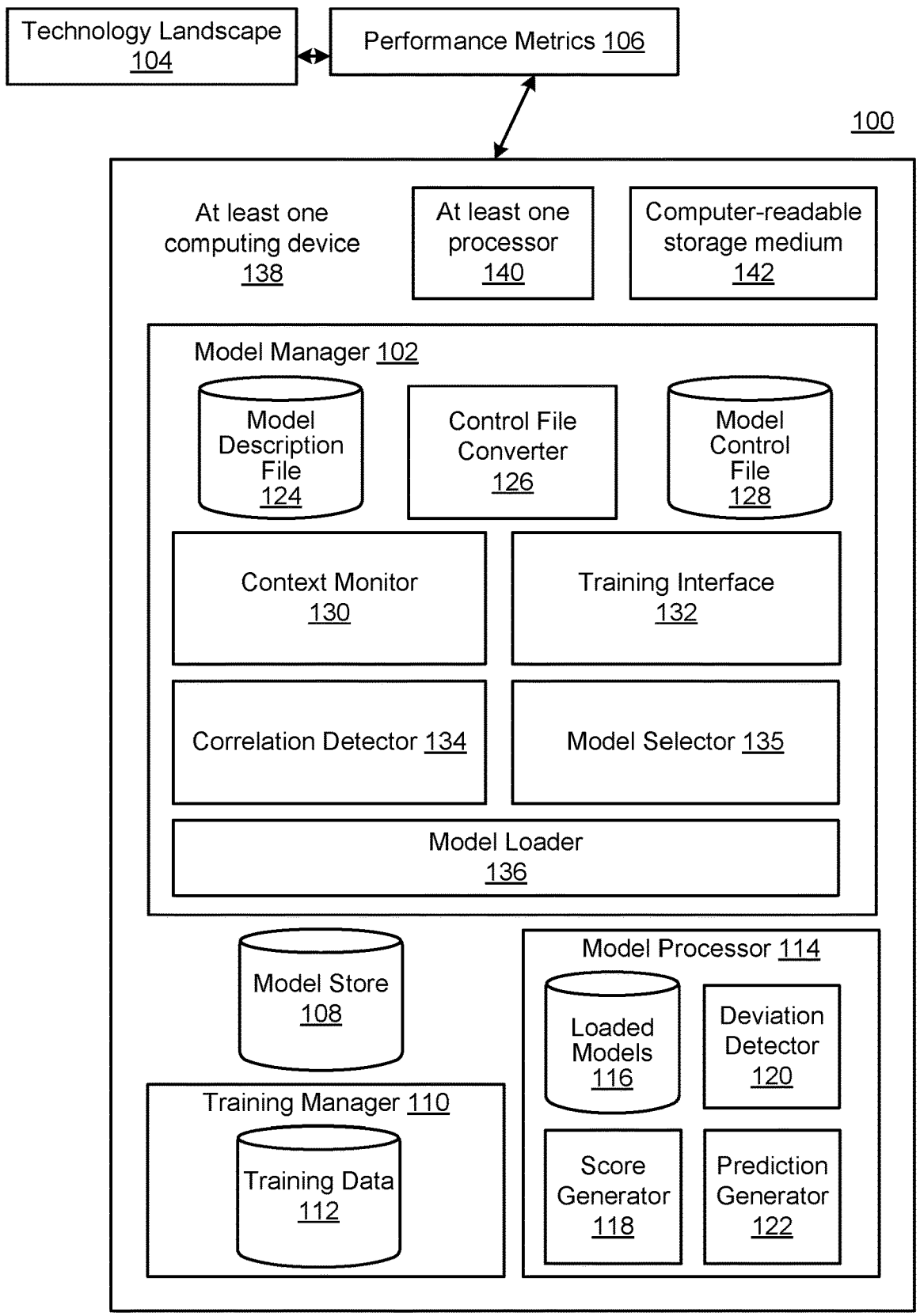
FIG. 1 is a block diagram of a system for multi-model performance prediction for technology landscapes.

Described systems and techniques provide actionable insights to enable reliable operations across a technology landscape. Such insights include, e.g., detection and characterizations of the nature, location, and timing of an existing or potential anomaly, as well as a severity or trend of such an anomaly. Accordingly, with insights, anomalies may be avoided or resolved in a minimal time period, with minimal effect, and with minimal knowledge, training, and effort required of a system administrator. With such insights, potential anomalies may be predicted and false positives reduced.

Described techniques use artificial intelligence or machine learning to process existing training data and construct a set of predictive models. Then, a real time system performance may be tracked, and subsets of the set of models may be dynamically selected and combined to provide collective, optimal anomaly predictions that are highly specific and tailored to existing conditions.

System performance in a technology landscape, such as within a computer or mainframe system, may be tracked and measured using performance metrics. For example, some performance metrics may include performance metrics commonly referred to as key performance indicators, or KPIs. For example, KPIs may include a percentage of central processing unit (CPU) resources in use at a given time, an amount of memory in use, and data transfer rates between system components. A given system may have hundreds or even thousands of KPIs that measure a wide range of performance aspects.

While some system workloads remain the same day to day, most workloads change seasonally, on the weekend, day to day, from shift to shift, and in response to varying other conditions or contexts that may occur. It is possible to define a static group of KPIs that is used to score or otherwise evaluate all such different workloads.

However, such an approach is inefficient and wasteful of resources, inaccurate, and prone to providing false positive alerts. For example, processing such a static group of KPIs for a system (e.g., using a single, inclusive predictive model) may involve processing irrelevant KPIs, such as when a KPI is used that is not relevant for a current situation or period of time. Moreover, static groups of KPIs used to score against models created with respect to irrelevant intervals are likely to be inaccurate. In particular, such approaches are prone to identifying false positives, e.g., predicting or identifying an anomaly that does not exist, or is not associated with any negative outcome. In such approaches, even if new KPIs are introduced, the associated scoring process is required to be updated, which may result in downtime and missed issues with system health.

In contrast, using the techniques described herein, machine learning and environmental awareness are applied to determine workload profiles and relevant KPIs active during seasonal disparities, shift fluctuations, working days vs. weekends, and other contextual scenarios. Example described techniques determine models characterizing system performance based on underlying KPIs, including determining which KPIs are relevant for what workloads, and automatically adding and removing associated predictive models (including, e.g., models built on KPIs or groups of KPIs) for a scoring cycle(s).

KPIs, and/or models built on KPIs or groups of KPIs, that are affected by a function or feature not currently in use can be removed from the mix based on the functions or features in use. The models built using KPIs or groups of KPIs can be continually and dynamically ranked to remove models associated with, or based on, poorly-performing metrics, where such dynamic ranking includes iterative ranking processes performed as operational contexts occur and develop, so that the described techniques adjust in response to such operational contexts. Scoring may be done for only those models relevant to the system workload for the appropriate context (e.g., time of day) to avoid producing false positives and to avoid wasting system resources. Moreover, an authorized user (e.g., system administrator) may add KPIs, or apply sensitivities or weighting of specified KPIs, or groups of KPIs, or models built thereon.

FIG. 1 is a block diagram of a system 100 for multi-model performance prediction for technology landscapes. In FIG. 1, a model manager 102 facilitates and provides performance prediction for a technology landscape 104, using performance metrics 106.

In FIG. 1, a plurality of predictive models may be stored in a model store 108. The predictive models may be generated by a training manager 110, using training data 112. For example, the training data 112 may be obtained from historical data included in the performance metrics 106.

As referenced above, and described in detail, below, the model manager 102 may be configured to actively and dynamically select, parameterize, create, and correlate models within the model store 108, and further configured to load specific combinations of such models from the model store 108 to a model processor 114. Further, the model manager 102 may be configured to directly or indirectly control operations of the model processor 114, so that the model processor 114 provides fast, efficient, reliable, and actionable performance predictions, with minimal or no false positives or false negatives.

In operation, the model processor 114 utilizes loaded models 116 by scoring relevant performance metrics (e.g., KPIs, or defined groups of KPIs) of the performance metrics 106 against corresponding models of the loaded models 116, using a score generator 118. For example, the score generator 118 may determine expected values of a specific KPI, according to a corresponding performance prediction model.

Then, deviations, e.g., anomalies, relative to the scores may be detected using a deviation detector 120. For example, as described below with respect to FIGS. 8, 10, and 12, scores may be generated for defined KPIs or groups of KPIs, and then thresholds may be set with respect to those scores. When the corresponding, actual KPI values are compared to the thresholds, corresponding deviations may be identified and characterized. For example, thresholds may be set as green/yellow/red values, so that a KPI with values that deviate from (e.g., exceed) each such threshold may be visually displayed in a corresponding color.

In conventional systems, it may be difficult to know how to define and adjust such thresholds, and incorrect thresholds may be prone to many false positives or false negatives. For example, thresholds may be required to be hard-coded into a conventional scoring application, which, as described above, may be monolithic.

Moreover, even for correctly-set thresholds, detected threshold deviations may not be sufficiently predictive. For example, an anomaly value exceeding a 'red' threshold for a KPI within a particular time period (e.g., during a particular minute when scoring occurs on a minute-by-minute basis) may be a transient occurrence, not associated with any actual failure or malfunction.

In FIG. 1, in contrast, the thresholds may be set for each model within the model store 108, reducing a level of difficulty and complexity in selecting appropriate values. Further, as the models are external to the model processor 114 and easily controlled by the model manager 102, it is straightforward to update any thresholds, as needed, without having to make any codes changes to the model processor 114.

A prediction generator 122 may be configured to generate any suitable manner or type of prediction (e.g., alert) to a user of the system 100. For example, the prediction generator 122 may provide additional levels of analysis beyond the detection of individual score deviations, such as trend analysis, and predictions based on combinations of model results. Performance predictions may include simple alerts indicating a malfunction, alerts indicating potential future malfunctions, or alerts identifying areas in which performance efficiency may be increased, or in which resources may be conserved. More detailed examples of performance predictions are provided below.

The loaded models 116 may be understood to represent, or contain, specific combinations of models from the model store 108, which have been selected, parameterized, and combined by the model manager 102 to be highly specific and configured to an existing context(s) within the technology landscape 104, even when such contexts are highly transient and/or subject to rapid changes. Moreover, the model processor 114 may be operated in a manner that uses available computing resources in an efficient manner, since the loaded models 116 represent a minimal set of models, model features, and performance metrics needed to make accurate predictions (e.g., alerts), while avoiding needless calculations (and use of associated processing and memory resources).

In FIG. 1, the technology landscape 104 may represent any suitable source of performance metrics 106 that may be processed for predictions using the system 100. For example, in some embodiments the technology landscape 104 may represent a mainframe computing environment, but the technology landscape 104 is not limited to such environments. For example, the technology landscape 104 may include many types of network environments, such as network administration for a private network of an enterprise. Technology landscape 104 may also represent scenarios in which sensors are used to monitor environmental conditions and report on corresponding status information (e.g., with respect to patients in a healthcare setting, working conditions of manufacturing equipment or other types of machinery, and many other industrial settings).

Consequently, the performance metrics 106 may represent any corresponding type(s) of data that is captured and reported, particularly in an ongoing, dynamic fashion, and for a potentially large number of performance metrics. For example, in a healthcare setting the performance metrics 106 may characterize either a condition of patients being monitored, or a condition of sensors being used to perform such monitoring. Similarly, the performance metrics 106 may characterize machines being monitored, or sensors performing such monitoring, in industrial settings.

In many of the examples below, which may occur in mainframe or networking environments, the performance metrics 106 may be referred to, or include, key performance indicators (KPIs). The term KPI should be understood broadly to represent or include any measurable value that can be used to indicate a present or future condition, or enable an inference of a present or future condition, with respect to a measured context (including, e.g., the example contexts referenced above). KPIs are often selected and defined with respect to an intended goal or objective, such as maintaining an operational status of a network, or providing a desired level of service to a user.

In some example implementations, the performance metrics 106 may represent or include a large repository of stored data. The system 100 may be instrumental in analyzing such data in a highly fast, efficient, customized, and reliable manner, as described herein.

In many implementations, however, the performance metrics 106 represent a real-time or near real-time data stream that is frequently or constantly being received with respect to the technology landscape 104. For example, as described in examples below, the performance metrics 106 may be considered to be received within defined time windows, such as every second, every minute, every five minutes, or every hour.

Within and among such time windows, a particular condition and associated performance metric may appear, disappear, or change in magnitude on a relatively frequent basis. Traditional or conventional performance prediction techniques are often limited and/or wasteful in such environments. For example, a conventional predictive model may base scoring on a performance metric that is currently not included within a received data stream, so that such scoring is computationally wasteful. Conversely, in other examples, a conventional predictive model may fail to account for a performance metric that is present within a received data stream, resulting in inaccurate predictions. Further, even if a conventional model is accurately and precisely tailored to an existing environment, contextual changes within such an environment (e.g., performance metrics coming online or going offline) may nonetheless render such conventional models inaccurate and/or wasteful over longer periods of time.

In contrast, the model manager 102 includes a model description file 124 that enables straightforward management of models within the model store 108. For example, the model description file 124 may represent a document that lists and describes all models within the model store 108, including relevant parameters, such as relevant KPIs, performance thresholds, and importance levels. As a simple document, e.g., spreadsheet, the model description file 124 may be easily created, maintained, and updated.

A control file converter 126 may be configured to convert the model description file 124, and updates/changes thereto, into a model control file 128. As described in detail herein, the model control file 128 may be implemented as consumable code that enables the types of customized combinations of models from the model store 108 described herein. That is, the model control file 128 enables the selection and parametrization of combinations of models from the model store 108 for loading into the loaded models 116 of the model processor 114, so that the model processor 114 may then proceed with executing the functions of the score generator 118, the deviation detector 120, and the prediction generator 122.

In order to leverage the model control file 128, the model manager includes a context monitor 130 that may be configured to detect environmental or other contextual changes within, or related to, the technology landscape 104 and/or the performance metrics 106. Such contextual changes may trigger corresponding changes to the models loaded to the loaded models 116 of the model processor 114. For example, a (type of) machine coming online, or going offline, may be detected and may trigger a corresponding addition to, or removal of, models from the loaded models 116.

In some cases, it may occur that the model store 108 does not currently contain a model that may be useful by the model processor 114. For example, the performance metrics 106 may contain a KPI (e.g., a newly-added KPI) that is not associated with a model. In other examples, a malfunction may occur that was not predicted by an existing model, and relevant KPIs existing prior to the malfunction may be identified for training in order to identify similar malfunctions in the future. In these and similar scenarios, a training interface 132 may be configured to determine such needs for new models, and to interface with the training manager 110 to construct the necessary models.

In this regard, it will be appreciated that the training data 112 may include historical data from the technology landscape 104, as referenced above, and may also be regularly updated with newly-occurring data, e.g., from the performance metrics 106. In this way, models in the model store 108 may be trained or re-trained on a regular or as-needed basis, in order to ensure relevancy and accuracy of the models within the model store 108.

Further with respect to the model manager 102, a correlation detector 134 may be configured to leverage the model control file 128 to optimize combinations of models from the model store 108. For example, in a simplified scenario, it may occur that a first model based on a first KPI is predictive of a particular malfunction within the technology landscape 104, while a second model based on a second KPI is also predictive of the particular malfunction. The correlation detector 134 may determine a correlation between the first model and the second model, such that a combined use of the first model and second model is more highly predictive of the particular malfunction than either of the first and second model by itself.

Operations of the training interface 132 and the correlation detector 134 may be reflected within the model control file 128. For example, output from the training interface 132 may be used to update the model description file 124, and/or the model control file 128, so as to reflect the existence of a newly-trained model within the model store 108. Similarly, correlations detected by the correlation detector 134 may be used reflect such correlations within the model control file 128.

A model selector 135 may thus be configured to use the performance metrics 106, as well information from the training interface 132 and the correlation detector 134 (as reflected within the model control file 128), as well as output from the context monitor 130, to select models from the model store 108 for loading into the loaded models 116 of the model processor 114. For example, an initial subset of models may be loaded into the loaded models 116.

Then, based on output from the context monitor 130, environmental changes within the technology landscape 104 may cause the model selector 135 and the model loader 136 to add new models to, and/or remove existing models from, the initial subset of models within the loaded models 116. Even if the initial subset of models is unchanged by any such environmental triggers, however, correlations detected by the correlation detector 134 may be used to update the manner in which the subset of models is scored or otherwise processed within the model processor 114, so as to increase an accuracy of predictions from the prediction generator 122.

Thus, a current set of models within the loaded models 116, and a manner in which such a current set of models is processed, may be constantly updated to ensure the type of fast, reliable, accurate, and computationally efficient processing described herein. To ensure these and related results, the model control file 128 provides a constantly-evolving file that accurately governs the creation, selection, and processing of appropriate models. For example, the model control file 128 may be updated based on feedback from the prediction generator 122, the correlation detector 134, or the training interface 132.

In other examples, the model control file 128 may be updated by an administrator to account for a newly-added KPI or other performance metric, or to account for a new value or parameter that may be changed within, or added to/removed from, all existing KPIs. Such updates may be easily performed through the use of the model description file 124 and the control file converter 126.

For example, a new KPI and associated parameters and thresholds may be added to the model description file 124. In other examples, a threshold range for detecting a deviation with respect to a KPI, or subset of KPIs, may be updated within the model description file 124. These and other changes may easily be processed by the control file converter 126 to update the model control file 128, in a manner that is consumable by the model selector 135 and the model loader 136. As a result, the model control file 128 may be easily managed and implemented, even though the model control file 128 may govern the use of large numbers of models within the model store 108.

In FIG. 1, the model manager 102 is illustrated as being implemented using at least one computing device 138, including at least one processor 140 and a non-transitory computer-readable storage medium 142. That is, the non-transitory computer-readable storage medium 142 may store instructions that, when executed by the at least one processor 140, cause the at least one computing device 138 to provide the functionalities of the model manager 102, and related functionalities.

For example, the at least one computing device 138 may represent one or more servers. For example, the at least one computing device 138 may be implemented as two or more servers in communications with one another over a network. Accordingly, the model manager 102, the model store 108, the training manager 110, and the model processor 114 may be implemented using separate devices, in communication with one another. In other implementations, however, although the model manager 102 is illustrated separately from the model processor 114, it will be appreciated that some or all of the respective functionalities of either of the model manager 102 and the model processor 114 may be implemented partially or completely in the other, or in both.

Figure 2:
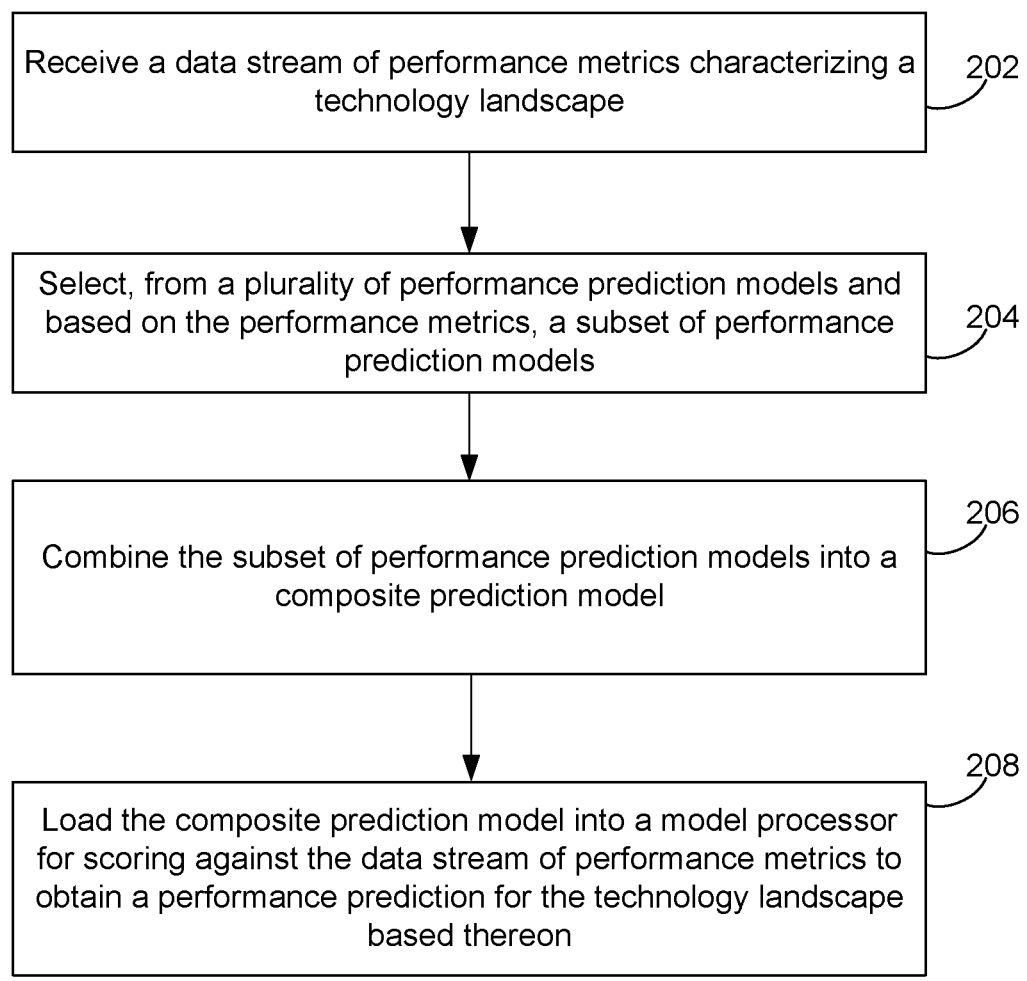
FIG. 2 is a flowchart illustrating example operations of the system of FIG. 1.

FIG. 2 is a flowchart 200 illustrating example operations of the system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In the example of FIG. 2, a data stream of performance metrics characterizing a technology landscape may be received (202). For example, the types of KPI metrics referenced above, more specific examples of which are provided below, may be received by the context monitor 130. As also described below, in some implementations, individual KPIs or other performance metrics may be categorized, combined, or otherwise grouped into KPI groups, which may then be treated as individual KPIs for purposes of, e.g., model training, model scoring, and performance prediction. The context monitor 130 may utilize, access, or include, one or more known or future tools for performance metric collection.

From a plurality of performance prediction models and based on the performance metrics, a subset of performance prediction models may be selected (204). For example, the training interface 132 may define and train the plurality of models in the model store 108, based on the training data 112. Each performance prediction model may be trained using a single performance metric, or, as just referenced, using a group of performance metrics (e.g., KPIs).

Then, the model selector 135 may select a subset of performance prediction models, based at least on the performance metrics 106. For example, as referenced above, the model selector 135 may utilize the model control file 128 to select a current subset of performance prediction models.

For example, the model control file 128 may effectively index available models within the model store 108, based on parameters associated with each model, and thereby enable ranking of performance prediction models, and selection of the subset from the ranking. That is, the subset of performance prediction models may be selected based on the model control file 128 providing an indexing of each of the plurality of performance prediction models with respect to the performance metrics 106.

For example, the performance metrics 106 may include recent values for a specific KPI, which may be known to be received from a particular component, or type or class of component, within the technology landscape 104. The model selector 135 may thus determine, from the model control file 128, performance prediction models which match or correspond to such KPI values, source components, or other parameters. The model selector 135 may thus select the subset of performance prediction models based at least in part on context information provided by the context monitor 130.

In some examples, context information and related parameters may include a recency threshold, so that more recently-received values are given more weight in the selection processes. As described herein, context information may include a current time period (daily, weekly, monthly, or seasonally), as well as relevant business conditions (e.g., service level agreements (SLAs)).

Model selection may also depend on a type of prediction desired. For example, the prediction generator 122 may be configured to generate an alert indicating occurrence of a malfunction, or indicating a potential future occurrence of a malfunction. The prediction generator 122 may also be able to predict configuration adjustments that may be made within the technology landscape 104 to obtain performance improvements, even when no malfunction occurs. In these and other scenarios, criteria for selecting the subset of performance prediction models may be matched with the types of predictions that are desired.

The model selector 135 may be configured to constantly or periodically evaluate a performance of the model manager 102 and/or the model processor 114, so as to update model selection accordingly. For example, the model selector 135 may rank or otherwise sort performance prediction models to identify and include models for loading into the loaded models 116, e.g., as one or more composite prediction models. The model selector 135 may thereafter evaluate relative levels of success of the loaded models 116 over time, and iteratively update the ranking accordingly. Thus, although the model selector 135 may update selected models over time based on changed contextual conditions, the model selector 135 also may update the selected models over time, even when no external context changes have occurred.

The subset of performance prediction models may be combined into a composite prediction model (206). For example, the model loader 136 may utilize the model control file 128 to combine the selected subset of performance prediction models from the model store 108 for loading into the loaded models 116 as a composite prediction model.

Due to the selection of the subset of performance prediction models as being most relevant and predictive with respect to current context information and performance metrics 106, the resulting composite prediction model enables highly accurate and efficient predictions by the model processor 114. Moreover, as described herein, the composite prediction model may be further customized and parameterized, to enable additional levels of accuracy and prediction ability.

For example, individual performance prediction models may be assigned varying levels of importance with the composite prediction model. Individual performance prediction models may be assigned different relative weights within the composite prediction model. In other examples, sensitivity thresholds defining deviations to be detected for a particular model may be adjusted, thereby making a particular model more or less sensitive and therefore more or less likely to contribute to a resulting performance prediction.

Still further, two or more of the performance prediction models within the subset of performance prediction models may be further correlated by the correlation detector 134. For example, a specific pair of KPIs may be correlated in time, so that temporally-overlapping deviations detected with respect thereto have a designated impact or result with respect to performance prediction.

The composite prediction model may be loaded into a model processor for scoring against the data stream of performance metrics to obtain a performance prediction for the technology landscape based thereon (208). For example, the model loader 136 may be configured to interface with the model processor 114, using the model control file 128 and the model store 108, to populate the loaded models 116.

The model processor 114 may be coded, configured, and otherwise constructed to receive any composite performance prediction model that may be provided by the model manager 102. In other words, the model processor 114 may be separated or decoupled from operations of the model manager 102 and any associated feature engineering performed using the model manager 102 to optimize operations of the model processor 114.

For example, the model processor 114 may be implemented in many different ways, some of which are described herein by way of example. For example, the model processor 114 in the example of FIG. 1 is illustrated as including the loaded models 116, the score generator 118, the deviation detector 120, and the prediction generator 122. However, in other implementations, the model processor 114 may not include all of these, and/or may include other aspects or features not specifically illustrated in FIG. 1. For example, the model processor 114 may provide a graphical user interface for interaction with a user, e.g., in conjunction with the prediction generator 122.

Regardless of such implementation details, the model processor 114 may be configured to execute any received or designated composite performance prediction model received from the model manager 102, even when the composite performance prediction model is frequently updated or changed, and even when new performance metrics or performance prediction models are added, without requiring code changes to the model processor 114 itself for resulting predictions to be generated.

For example, in example implementations, the model control file 128 and the performance prediction models of the model store 108 may be written in Javascript Object Notation (JSON), while some or all of the operational modules 130-136 of the model manager 102, and the model processor 114, may be written in Java. Accordingly, it may be straightforward to parameterize and load individual models as a composite prediction model in a desired manner (e.g., as a Java object), and thereby expose desired information to the model processor 114, while retaining an ability to programmatically change aspects of the individual models, and combinations thereof, when being processed by the model processor 114.

The model control file 128 thus represents a dynamic, updateable file, that is responsive to both user changes (as received via the control file converter 126), and to contextual or environmental changes (as detected by the context monitor 130, training interface 132, or correlation detector 134). For example, a user may easily change a sensitivity of a deviation threshold for a particular KPI. In other examples, a user may group two or more KPIs that the user considers to be related and predictive, and a corresponding performance prediction model may be trained for the defined KPI group.

Meanwhile, the model manager 102 may effectively create a new KPI or group of KPIs by combining and/or correlating existing performance prediction models for individual KPIs or groups of KPIs. For example, such created KPIs may be determined or defined by deriving a KPI from multiple fields of multiple existing KPIs, such as by determining one KPI as a percentage of another KPI.

These and other changes may be made dynamically over time, without requiring code changes to the model processor 114. Instead, the underlying performance metrics being used, and associated performance prediction models, may be changed as needed, and automatically and accurately be reflected within a UI of the model processor 114.

In other examples, the performance prediction models and/or the model control file 128 may be constructed using different notation and/or languages. For example, performance prediction models may be constructed using the Predictive Model Markup Language (PMML), which is an eXtensible Markup Language (XML) based model interchange format, or other suitable techniques. The performance prediction models may use any known or future algorithm for performance prediction, such as a neural network, or various types of regression analysis.

Figure 3:
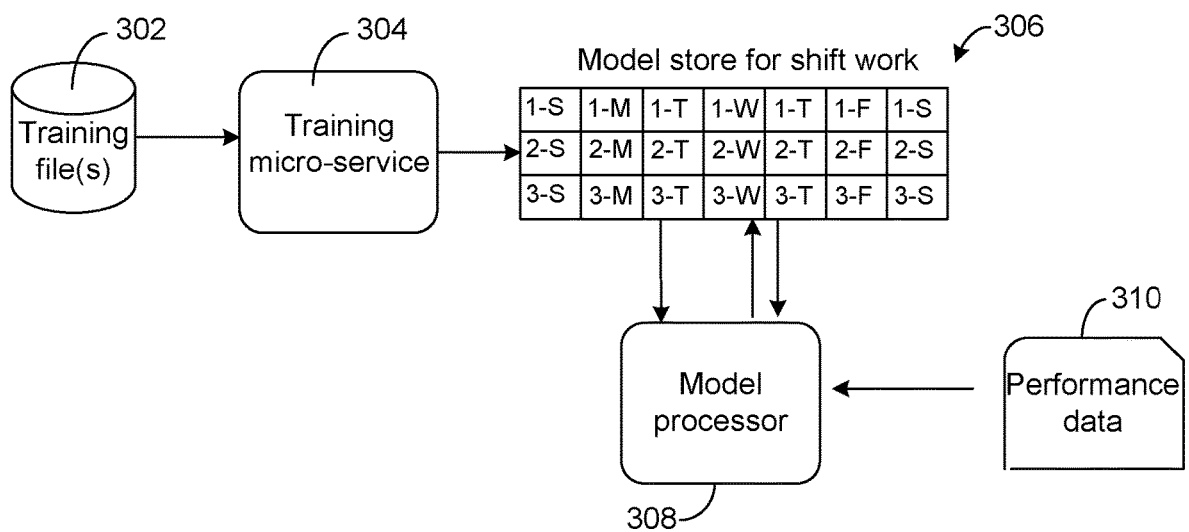
FIG. 3 is a block diagram of an example implementation of FIG. 1 illustrating dynamic model adjustments to account for shift work.

FIG. 3 is a block diagram of an example implementation of FIG. 1 illustrating dynamic model adjustments to account for shift work. In FIG. 3, training files 302 represent example files storing the type of training data 112 described with respect to FIG. 1. A training micro-service 304 illustrates an example of the training manager 110 of FIG. 1, and associated functionality. During model generation, e.g., a customer's shift work data is used and the training micro-service 304 may detect patterns in KPIs such as throughput, connection type, or CPU usage, based on time, date, weekday, and holidays. The training micro-service 304 creates models based on the detected patterns, e.g., both for single KPIs, as well as KPI groups.

A model store 306 illustrates an example of the model store 108, and a model processor 308 provides an example of the model processor 114. As shown, the model store 306 may include three different models for corresponding first, second, and third shifts occurring on each day of the week, Sunday (S), Monday (M), Tuesday (T), Wednesday (W), Thursday (T), Friday (F), and Saturday (S).

As may be understood from the above description of FIGS. 1 and 2, each of the resulting twenty-one shifts may be associated with a corresponding composite prediction model that is loaded into the model processor 308 during a corresponding time period (in conjunction with unloading of a composite prediction model of a preceding shift). Accordingly, each such composite prediction model may be optimized for a context of a corresponding shift.

Thus, real time performance data 310 may be received on an ongoing basis, and the model processor 308 will provide accurate performance predictions based thereon, throughout an entire workweek. There is no need to make changes to the received performance data 310, as the model processor 308 will utilize only the received metrics that are required within any given shift, based on the corresponding composite prediction model that is currently loaded. Moreover, as described, computational resources of the model processor 308 may be conserved, as processing occurs only for the performance metrics that are most relevant to the current shift.

FIG. 3 provides a simplified example in which a composite prediction model is loaded for each of the illustrated shifts. However, in various implementations, model adjustments may be made within each shift, as well, such as referenced above and described below with respect to the use of environmental triggers of FIG. 4. For example, for a given shift, a corresponding composite prediction model may provide a default or initial model to be used for that shift, which may then be updated as needed during the shift, based on environmental triggers, or other factors.

Figure 4:
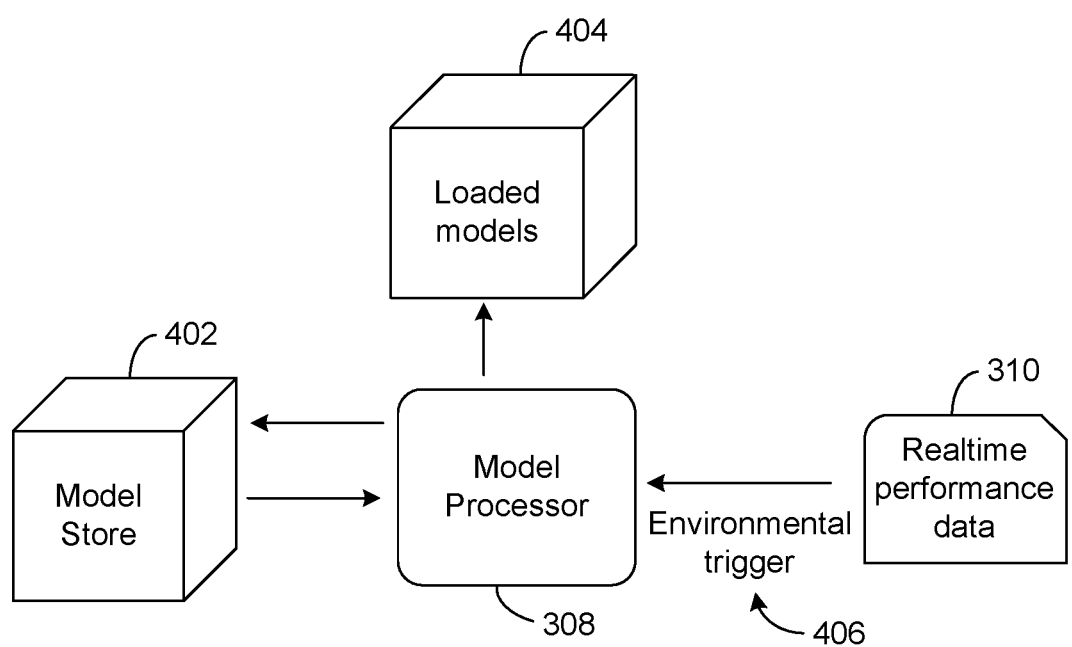
FIG. 4 is a block diagram of an example implementation of FIG. 1 illustrating dynamic model adjustments in response to environmental context triggers.
Figure 5:
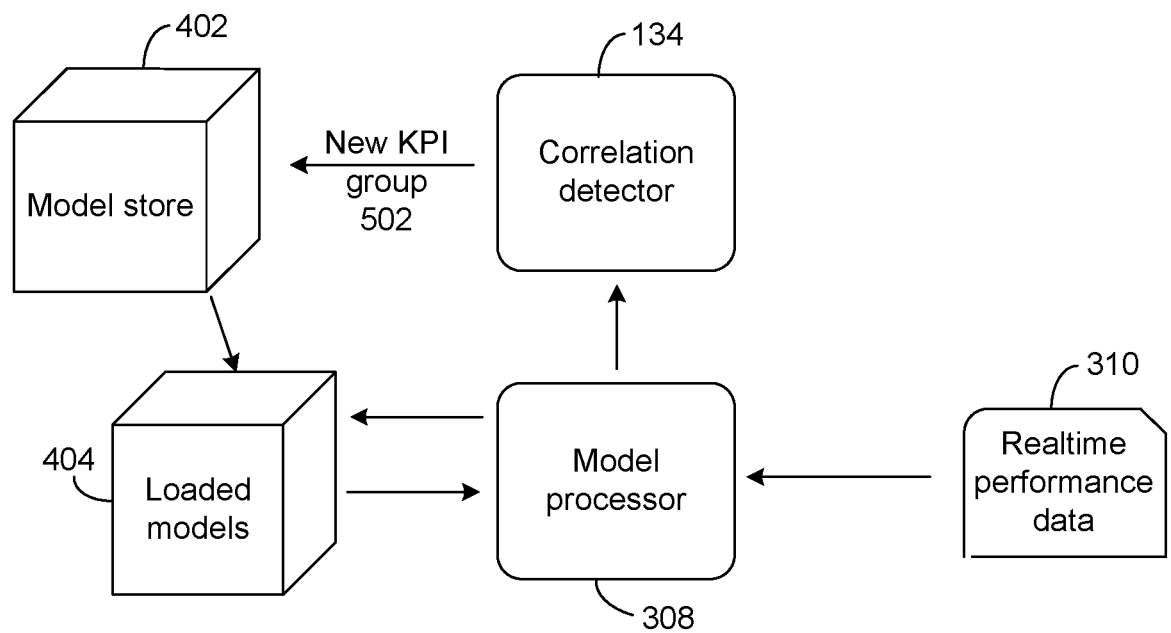
FIG. 5 is a block diagram of an example implementation of FIG. 1 illustrating dynamic model adjustments that include model correlation detection.

Although not separately illustrated in FIGS. 3-5, it will be appreciated from FIGS. 1 and 2 that the model manager 102 may be configured to execute the various model adjustments described with respect to FIGS. 3-5. For example, the model manager 102 may be configured to execute the selecting, updating, loading, and unloading of the various shift-specific models of FIG. 3, as well as to make the types of intra-shift adjustments just described.

FIG. 4 is a block diagram of an example implementation of FIG. 1 illustrating dynamic model adjustments in response to environmental context triggers. In FIG. 4, a model store 402, corresponding to the model store 108 of FIG. 1 and similar to the model store 306 of FIG. 3, stores a plurality of pre-trained performance prediction models. Loaded models 404 are accessible by the model processor 308 for processing the performance data 310.

When an environmental trigger 406 is detected within the performance data 310 (e.g., by the model processor 114 and/or the model manager 102), the model manager may determine corresponding model adjustments to be made in response thereto. For example, an example of use of such environmental awareness may be that a system administrator allows distributed transactions to execute across an enterprise technology landscape. As just described, such an environment change may be detected, and the subset of models forming a loaded composite prediction model may be updated to include KPIs (e.g., groups of KPIs) associated with the distributed workload to the scoring, while removing KPIs (e.g., groups of KPIs) not associated with the scoring.

FIG. 5 is a block diagram of an example implementation of FIG. 1 illustrating dynamic model adjustments that include model correlation detection, and associated automatic creation of new KPI groups. As referenced above, a performance prediction model may be based on a group of KPIs. In FIG. 5, as the model manager identifies new relevant KPI correlations (e.g., from new training data, or from stored system data), described techniques can be used to create new KPI groups, and corresponding new models to include within the set of models in a model store. In this way, it is possible to improve accuracy and dynamically add new models, without interruption to scoring and prediction operations.

Thus, in FIG. 5, during scoring, the model manager 102 may detect correlations between KPIs, using, e.g., the correlation detector 134 of FIG. 1. For example, two or more KPIs may be correlated as occurring within a same or overlapping time window and being associated with a particular type of anomaly (e.g., malfunction).

A resulting new KPI group 502 and associated model may be evaluated, and if accepted as being sufficiently accurate, may be stored in the set of models in the model store 402. If current environment conditions warrant (as described with respect to FIG. 4), the new model may be loaded and used in scoring operations of the model processor 308, with respect to detected real time system data.

Figures 6A, 6B:
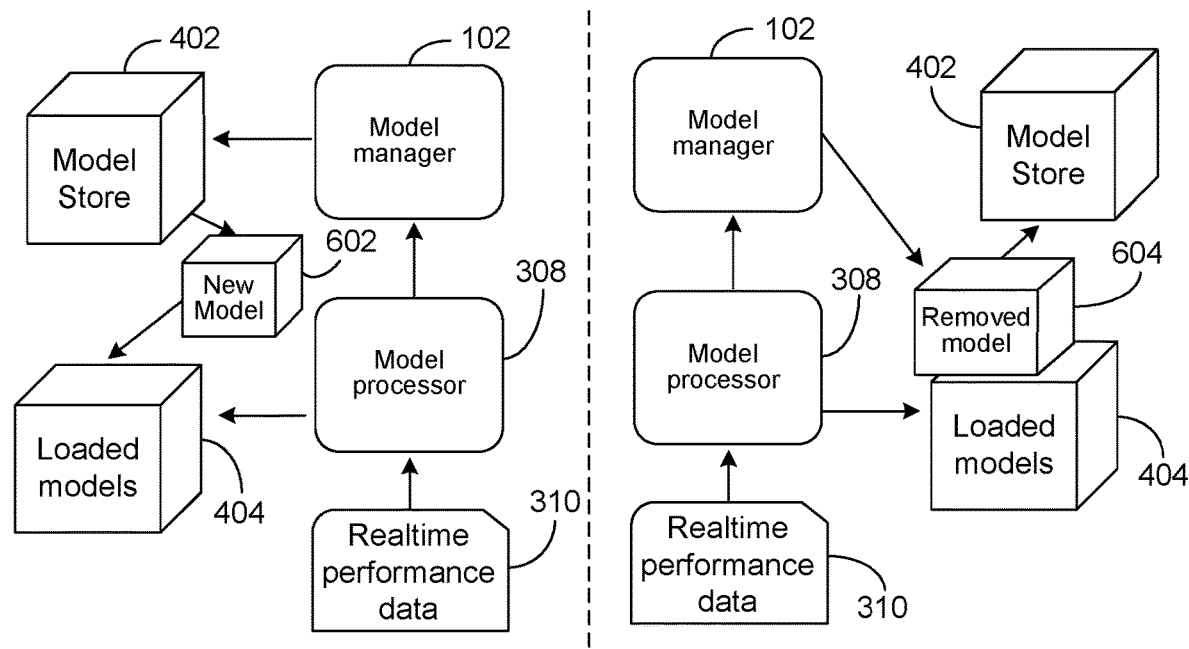
FIG. 6A is a block diagram of an example implementation of FIG. 1 illustrating addition of a new performance prediction model to loaded models.
FIG. 6B is a block diagram of an example implementation of FIG. 1 illustrating removal of a performance prediction model from loaded models.

FIG. 6A is a block diagram of an example implementation of FIG. 1 illustrating addition of a new performance prediction model to loaded models. FIG. 6B is a block diagram of an example implementation of FIG. 1 illustrating removal of a performance prediction model from loaded models.

In FIG. 6A, the model manager 102 may detect an environmental trigger, machine learning factor, or other contextual indicator that indicates that a new model 602 is needed. The model manager 102 executes an application control process to load the new model(s) 602 corresponding to the identified KPI or KPI group to loaded models 404 from the model store 402, which can be done easily as all KPI-based models have been previously trained. The new model(s) 602 may thus be loaded and used for scoring in the model processor 308.

In FIG. 6B, an environmental trigger, machine learning factor, or other contextual indicator indicates that a KPI or KPI group is no longer needed. The model manager 102 may then remove the associated model(s) 604, so that a scoring engine of the model processor 308 no longer scores using that model.

Dynamically adding and removing models from scoring, as shown in FIGS. 6A, 6B and discussed herein, has a direct benefit to performance. For example, it may only be required to score a small subset of all potential KPIs and associated models during off-peak hours, reducing the resources used. As machine learning identifies new relevant KPI correlations, adding targeted KPIs and associated models to the scoring will improve accuracy. Dynamically adding and removing KPIs and associated models from the scoring process may be done without interruption, thereby allowing continuous oversight.

Figure 7:
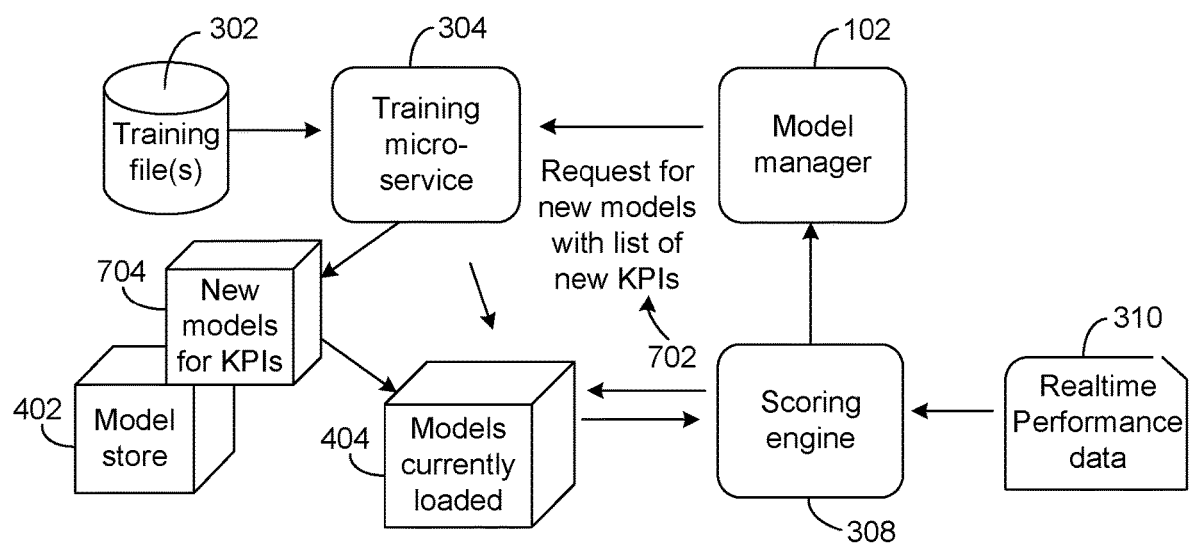
FIG. 7 is a block diagram of an example implementation of FIG. 1 illustrating training of a new performance prediction model to be included in loaded models.

FIG. 7 is a block diagram of an example implementation of FIG. 1 illustrating training of a new performance prediction model to be included in loaded models. In FIG. 7, dynamic model requirements detection and generation are illustrated. Specifically, when a new KPI is added, real-time notification 702 of the need for a new model generation may occur, or a new model(s) 704 may be automatically created.

In FIG. 7, the model manager 102 detects anomalies based on KPIs or environmental factors for which no models exist. The model manager 102 notifies the training micro-service 304 to build a model against the appropriate KPIs. The training micro-service 304 builds the new model(s) 704 and loads them into the model store 402. The model manager 102 may then deploy the new model(s) 704.

Figure 8:
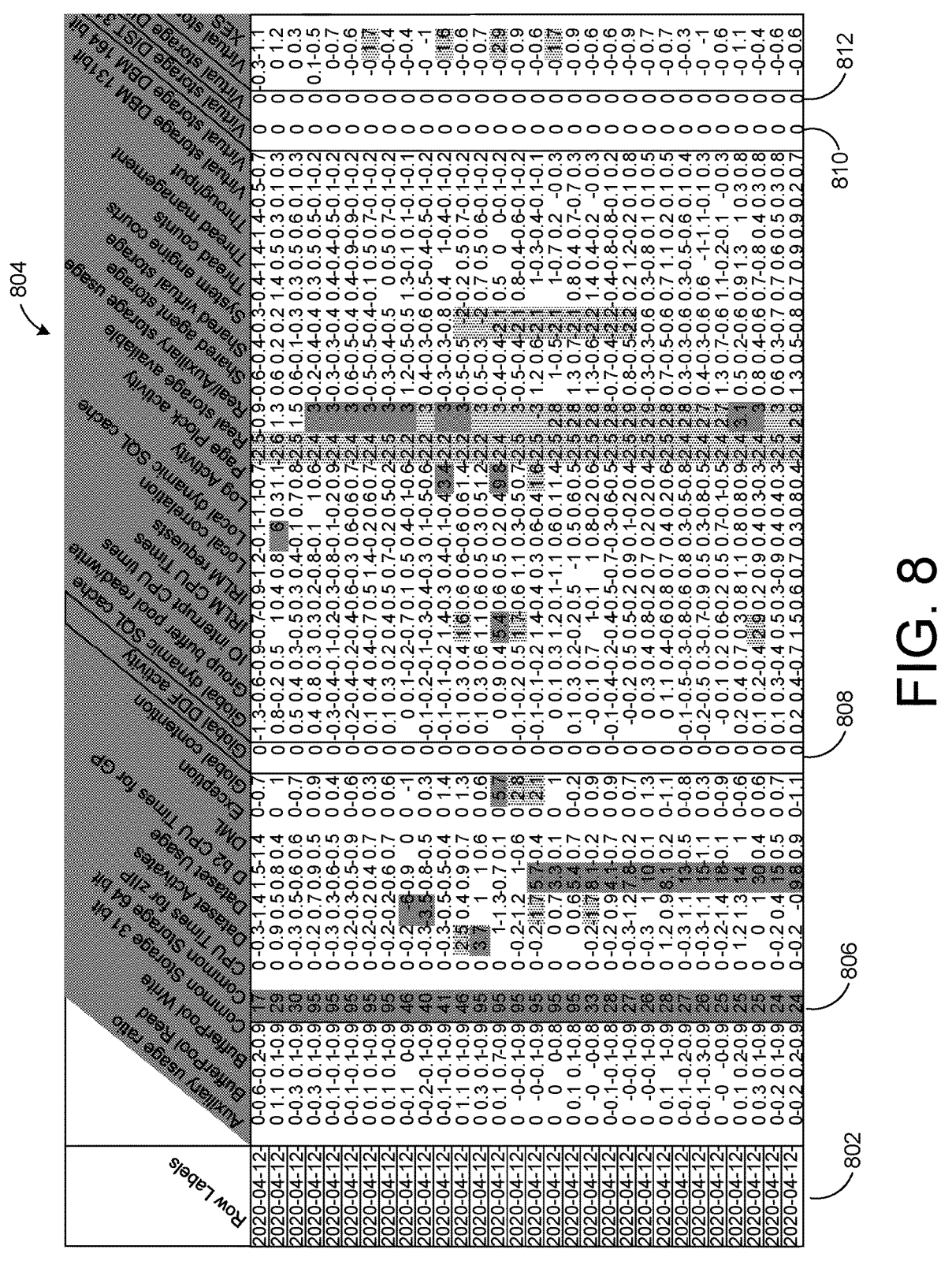
Figure 9A:
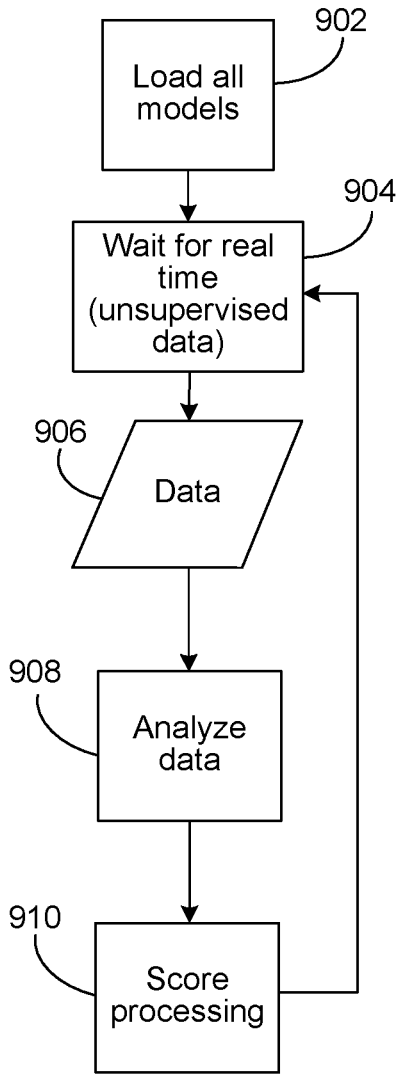
FIG. 9A is a first flowchart illustrating the example of FIG. 8.
Figure 9B:
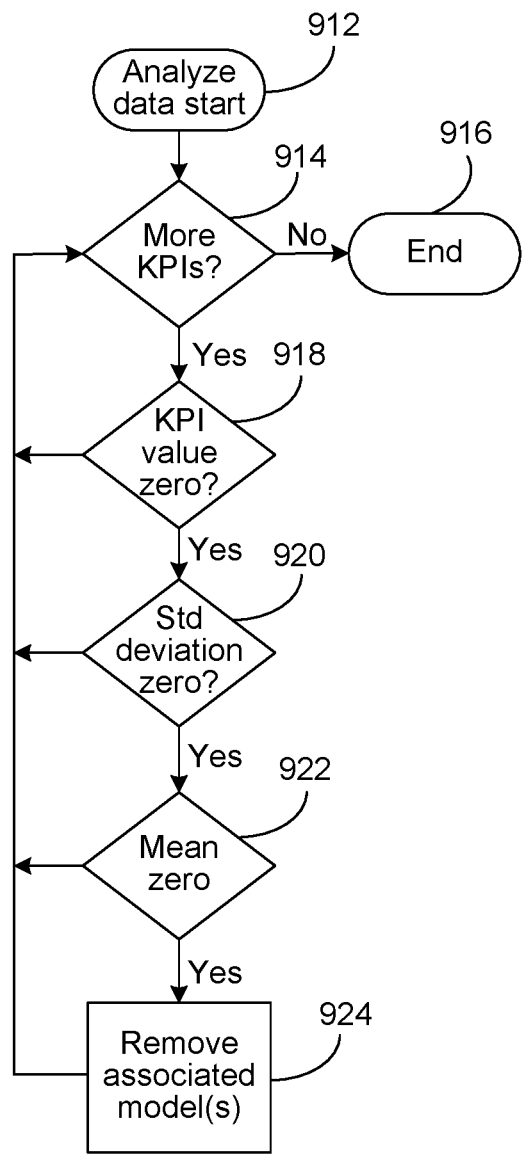
FIG. 9B is a second flowchart illustrating the example of FIG. 8.

FIG. 8 illustrates example data for a first example use case, in which a model is removed from loaded models. FIGS. 9A and 9B are flowcharts illustrating the example of FIG. 8. In FIG. 8, as well as FIGS. 10 and 12, columns include KPI groups, so that every column definition may be based on an underlying group of KPIs (membership of which may be updated over time), and each column value may be a composite and possibly weighted value of such KPIs. Cells and columns may be highlighted to indicate potential correlations between corresponding values. An extent of such correlation may be based on, e.g., an extent of time during which the correlation occurs, an extent to which the value exceeds a threshold, or various other correlation factors.

Further in FIGS. 8, 10, and 12, it is assumed that threshold values are set such that scores above/below zero within a first threshold(s) (e.g., from −1.5 to 1.5, or from −3.0 to 3.0) are considered "green," or acceptable, scores outside of the first threshold but within a second threshold(s) (e.g., from −3.0 to −1.5 and from 1.5 to 3.0, or from −6 to −3 and from 3 to 6), are considered "yellow," or cautionary (shown with first, darker cross-hatching), and scores outside of the second threshold(s) (e.g., below −3 or above 3, or below −6 and above 6) are considered "red" or anomalous (shown with second, lighter cross-hatching). As described herein, other scoring values, ranges, and thresholds may be set.

In FIG. 8, a column 802 provides row labels corresponding to individual time windows (e.g., individual minutes) for which KPI values are captured and characterized. Columns 804 identify the relevant KPIs, or groups of KPIs.

In the example of FIG. 8, a column 806 for "common storage 64 bit" is consistently anomalous through the illustrated time period. A column 808 for "Global DDF activity", a column 810 for "virtual Storage DIST 31 bit", and a column 812 for "Virtual Storage DIST 64 bit" are illustrated as having "0" values.

For example, it may occur that a user does not have a feature enabled, leading to such "0" values. For example, IBM's Db2® distributed data facility (DB2 DDF) feature may not be enabled. The KPIs associated with the DB2 DDF feature are the just-mentioned Global DDF Activity, Virtual Storage DIST 31 bit, and Virtual Storage DIST 64 bit in columns 808, 810, 812. FIG. 8 shows example scoring for a weekend test and shows that the KPIs mentioned are all "0." Accordingly, a corresponding model(s) may be removed from the subset of models being used, as shown in the flowcharts of FIGS. 9A and 9B. Consequently, no resources are thereafter wasted on scoring using this model(s), when the DB2 DDF feature is not enabled and no predictive value would be obtained.

FIGS. 9A and 9B are flowcharts illustrating example processes for generating and utilizing the data illustrated in FIG. 8. In FIG. 9A, all relevant models are loaded (902). That is, models corresponding to each of the columns 804 may be loaded to the model store 108 of FIG. 1, or the model store 402 of FIG. 4.

The system then waits for real time, unsupervised data (904), such as the performance metrics 106 of FIG. 1, or the performance data 310 of FIG. 3. For example, KPIs corresponding to the various metrics listed in the columns 804 of FIG. 8 may be received. As referenced, each column 804 may represent a group of two or more KPIs; that is, a model may be trained with respect to combinations of KPIs. In such cases, the included KPIs may be weighted equally, or may be assigned different weights indicating relative levels of impact of each KPI in the group.

The performance data may then be received over time (906). Desired time windows may be assigned and used, such as individual minutes, or hours, or time periods defined with respect to anticipated usages of different types of hardware and software components.

The data may be analyzed (908), where, in general, such data analysis includes score pre-processing that includes and encompasses various types of model management described herein, including removal or addition of models from the currently-loaded models. FIG. 9B provides a more detailed example of such data analysis consistent with the example of FIG. 8, in which a model(s) is removed.

Finally in FIG. 9A, score processing may proceed (910). For example, the various scores and associated anomaly detection of FIG. 8 may be calculated, based on the remaining, included models.

In FIG. 9B, data analysis begins (912) with determining whether any KPI(s) remain to be analyzed (914). If not, the process ends (916). When at least one KPI remains, determination may be made as to whether the KPI value is zero (918), whether a standard deviation of the KPI value is zero (920), or whether a mean value of the KPI is zero (922). As illustrated, if any of these determinations yield a non-zero value, the corresponding KPI model is not removed, and the remaining KPI (if any) is analyzed (914). On the other hand, if all of these determinations yield a zero value, then the associated model(s) may be removed (924), based on the absence of the corresponding KPI values, thereby increasing computational speeds and/or conserving computational resources as described herein.

Figure 10:
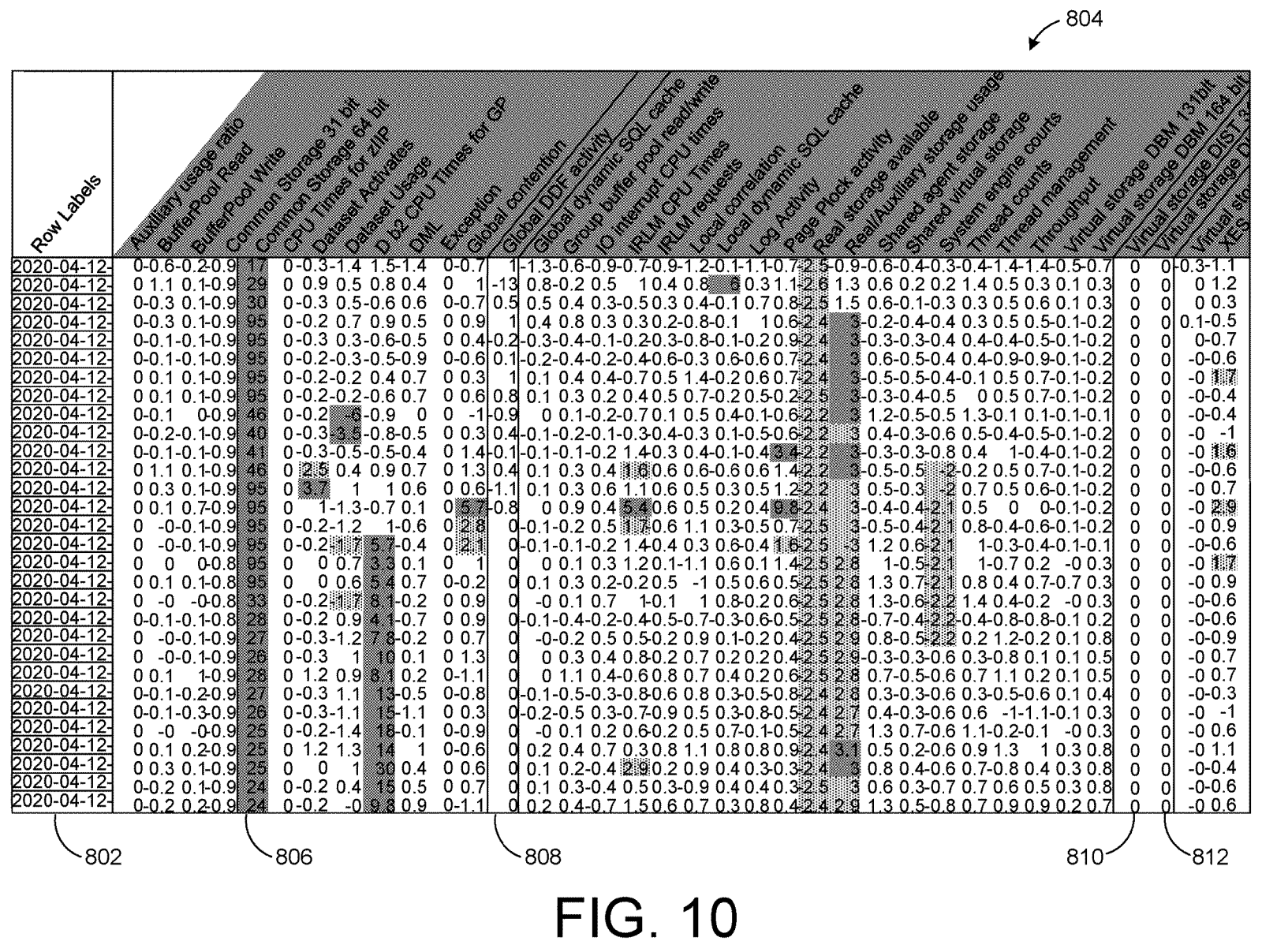
Figure 11:
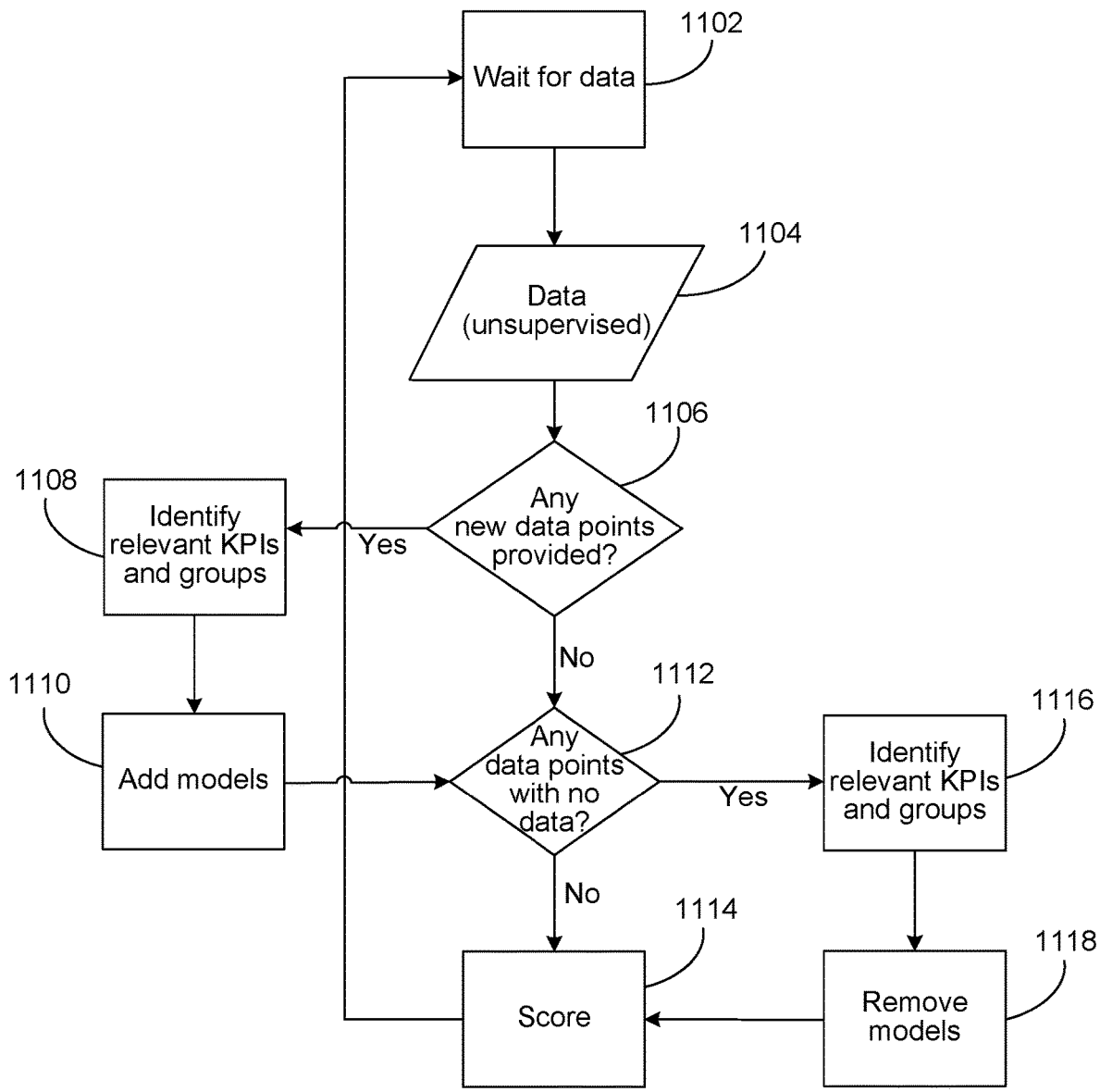
FIG. 11 is a flowchart illustrating the example of FIG. 10.

FIG. 10 illustrates example data for a second example use case, in which model(s) are dynamically removed and added from loaded models. FIG. 11 is a flowchart illustrating the example of FIG. 10.

In FIG. 10, it is assumed that the DB2 DDF feature referenced above is enabled at a customer site. In the example, the DB2 DDF features stops, causing the related KPI values in columns 808, 810, and 812, for KPIs Global DDF Activity, Virtual Storage DIST 31 bit, and Virtual Storage DIST 64 bit, respectively, to go to values of zero, as shown.

Thus, in response, the corresponding models related to the DB2 DDF feature are no longer scored on until the DB2 DDF feature is restarted. Once the feature is restarted, the associated models may be reloaded, and scoring may continue. That is, although not explicitly illustrated in FIG. 10, when the DB2 DDF feature restarts, values other than zero would show at corresponding time values.

In FIG. 11, after waiting for data initiation (1102), unsupervised performance data is received (1104), as described above with respect to FIG. 9A. If any new data points are received (1106), then corresponding relevant KPI(s), or groups thereof, may be identified (1108), and then corresponding models may be added (1110) to the loaded models.

If no new data points are received (1106), or once new models have been added, then any data points with no data may be identified (1112). As generally described with respect to FIG. 9B, if a KPI(s) or groups thereof have zero values, then such KPIs/groups may be identified (1116), and corresponding models may be removed from the loaded models (1118).

If all relevant data points receive nonzero values (1112), and/or once any models have been removed (1118), scoring may continue (1114). Thus, FIGS. 10 and 11 illustrate that models may be added and removed dynamically, including removing and adding a model(s) in conjunction with a corresponding deactivation and activation of an underlying feature or component, as detected through value detection with respect to a corresponding KPI(s).

Figure 12:
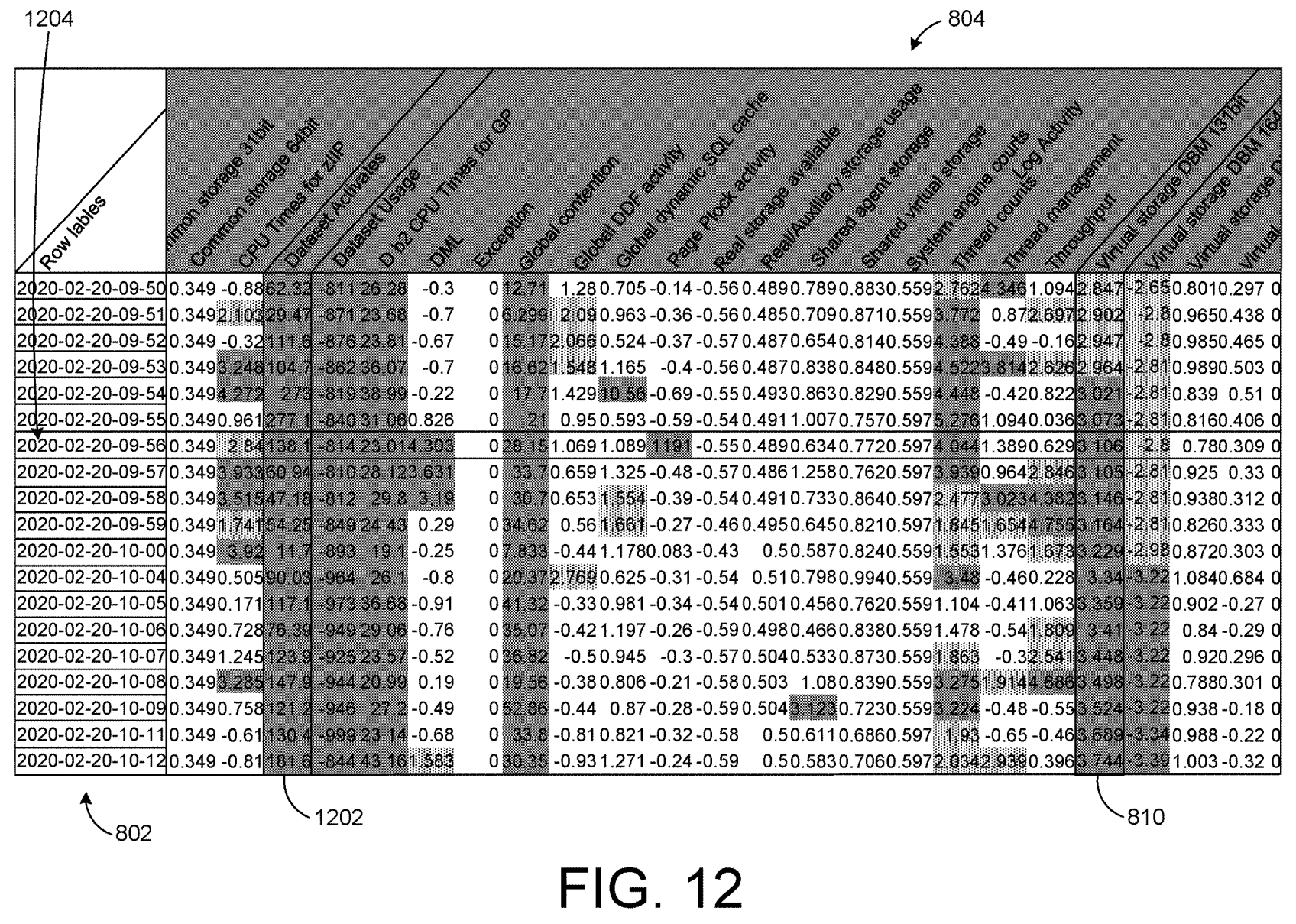

FIG. 12 illustrates example data for a third example use case, in which a new model is added to a model store, such as the model store 108 of FIG. 1, or the model store 402 of FIG. 4, and then included in the loaded models (e.g., loaded models 116 in FIG. 1, or loaded models 404 of FIG. 4) when needed. FIGS. 13A and 13B are flowcharts illustrating the example of FIG. 12.

In FIG. 12, it is assumed that a bug is inadvertently and undesirably introduced into Db2, in which opening a dataset (referred to as "dataset opens") is a condition that causes a storage leak in Db2 storage. It may occur that there has never been a correlation with storage use and dataset opens, causing the source of the storage leak to be difficult to track. Described techniques will detect the correlation between the leak and the number of dataset opens, and allow the investigation to be focused on dataset opens.

The example data of FIG. 12 shows the detected correlation between the Dataset Activities KPI in column 1202 and the Virtual Storage DBM1 31 bit KPI in column 810. For example, such a correlation may be detected by the correlation detector 134 of FIG. 1 at a time value corresponding to a row 1204.

At this point, a new model may be created that represents the correlation, as described above. The resulting new model may be added to the appropriate model store, and to the loaded models.

In FIG. 13A, it is assumed that score processing (1302) is in process, as described above with respect to FIGS. 8-12. As long as no correlations are detected (1304), score processing (1302) may continue. If a score correlation is detected (1304), as in FIG. 12, then the corresponding KPIs may be analyzed (1306), as described in more detail, below, with respect to FIG. 13B.

If a new KPI group is determined to be appropriate by the KPI analysis, then a new KPI group may be created (1308). If a corresponding model already exists, or is not otherwise required (1310), then score processing (1302) may continue. Otherwise, a new composite prediction model may be created (1312), and then loaded to the loaded models (1314). Score processing (1302) may then continue.

In FIG. 13B, the KPI analysis (1306) begins (1316) with determining whether a KPI remains to be analyzed (1318). If not, the process ends (1320). If so, it is determined whether the KPI is part of a detected correlation (1322). For example, the KPI values of columns 1202 and 810 were determined to be correlated, while other KPI values were not correlated. For a finding of no correlation, processing continues with a subsequent KPI (1318). For a correlation finding, a corresponding KPI may be included in a new KPI group (1324).

In some implementations of FIG. 1, performance prediction models as described herein may be described and/or implemented in JSON, PMML, various types of XML or XML-based formats, or other formats. In FIG. 1, the model description file 124 may be implemented as a spreadsheet or other convenient document format. The control file converter 126 may be implemented using Python or other suitable programming language, and may be configured to build dictionaries of the model control file 128. The model control file 128 may be implemented in any format compatible with the model description file 124 and the control file converter 126, and also compatible with remaining modules 130-136 of the model manager 102, and with the corresponding implementation of the model processor 114. For example, the model control file may be implemented in JSON, and the modules 130-136 and the model processor 114 may be implemented in Java.

As referenced above, each model may include, as applicable or desired, a name of the model, any associated schema information, an identification of a corresponding KPI or other performance metric, a group (if any) to which the KPI belongs, and an algorithm that has been trained to provide a defined, corresponding type of scoring.

For example, each model may include a definition of the scoring as including a characterization of a KPI value relative to standard deviations from a trained value, normalized to a defined scale that is applicable to all included KPIs. As described above, a KPI value may then be scored relative to a normalized scale, and assigned a value of "green" for normal/acceptable for values of −1.5-1.5, "yellow" or caution from −3.0 to −1.5 and 1.5 to 3.0, and "red" or anomaly for values below −3.0 or above 3.0. Other values/thresholds may be used, and such values/thresholds may easily be updated within each of the models in the model store 108, using the model manager 102.

Each model may include an assigned weight that defines a proportional impact of that model (and associated KPI) within a group of models/KPIs, when implementing the above-described scoring techniques. As with other aspect of the scoring, such weights may easily be updated.

Each model may also include an assigned importance value. For example, in FIGS. 8, 10, and 12, as described, any individual cell (row/column), representing a scored KPI value at a scored time window, may be in a "red" or anomalous/deviation state. However, as referenced above, such a state may be a transient state that does not impact performance or require any corrective action. In other words, such a state may not, by itself, be important for purposes of performance prediction.

On the other hand, for some KPIs and corresponding models, a single anomalous value may be highly predictive of a current or potential failure or performance degradation. Further, as also described herein, some combinations of KPIs and corresponding models, although not highly predictive individually, may be correlated as being highly predictive in combination.

Accordingly, and to implement the techniques described herein, each model may be assigned an importance value, e.g., on a scale of 1-10, or other suitable scale. Further, a prediction threshold may be set that defines when a prediction is generated by the prediction generator 122 that performance will be (or has been) impacted.

For example, in one implementation, if all models are assigned an equal importance value of "1," and the prediction threshold is set to "7," then seven of the models would need to be in an anomalous state for a prediction to be generated by the prediction generator 122. If a new model is added with an assigned importance of "5," then a prediction would be generated based on an anomalous state of the new model together with just two other models being in an anomalous state.

In this way, false positives may be avoided, which might otherwise occur in response to every anomalous state detected. Moreover, detected correlations between models may easily be reflected and implemented by updating corresponding importance values of one or all correlated model(s). Importance values may be applied universally, or, in some implementations, may be applied in specified combinations of models. For example, a model may have two importance values, where one importance value is assigned generally, and the second importance value is used only in combination with a correlated model.

In some implementations, ostensibly or normally anomalous states may not actually be indicative of any current or potential malfunction. For example, during some startup procedures, memory usage may accelerate or spike to high levels before normalizing. Such memory usage might normally be characterized as a malfunction, but during startup procedures, such a characterization would result in a troublesome false positive.

To avoid such false positives, the types of correlations described herein may be used. For example, combinations of importance values may include zero or negative values. For example, a KPI and associated model having values indicating a startup condition may have a negative value in correlation with a KPI and associated model having values indicating high memory usage, so that together, no alert is generated for high memory usage during startup.

As also referenced, KPI values may be grouped based on various factors. For example, a group of KPIs may be defined as being related to storage or CPU usage. Derived KPIs may be defined as combinations of groups, including aggregations, derivations, or other combinations of KPIs or KPI groups.

Thus, using machine learning, the described techniques anticipate workload changes based on current context and react accordingly by altering the models for the appropriate KPIs. For example, a brokerage firm may normally have a large increase in transactions at market open, causing a spike in the workload that could trigger false positives if the system had not anticipated the spike.

Each model is consistent with (e.g., uses the same scoring approach as) all the other models within the set of models. Therefore, it is possible to combine any two or more of the models within the set of models to obtain a subset of models that corresponds to current system conditions and contexts. The models in the subset may be weighted to reflect relative levels of importance of each model included.

Moreover, the subset of models may be updated over time (e.g., one or more models may be added to, or removed from, the subset), to best reflect current system conditions or system administrator preference, weights, and importance. For example, correlations between groups of KPIs detected within the training data may be used to define and update the subset of models over time, based on detection of corresponding conditions or correlations within current system data.

Thus, described techniques provide improved accuracy and better performance over existing systems. Since KPIs may be trained in advance, changes are transparent to the user and are performed without interruption to the scoring process(es). Moreover, such changes may be executed at a speed, frequency, or scale that would not be feasible for a human user to maintain.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive a data stream of performance metrics characterizing a technology landscape, the performance metrics being a subset of available performance metrics;

convert model description data describing a plurality of performance prediction models into a model control file including consumable code that indexes the plurality of performance prediction models with respect to the available performance metrics and with respect to at least one correlation between two or more of the available performance metrics;

execute the model control file to select, from the plurality of performance prediction models and based on the performance metrics and on the at least one correlation, a subset of performance prediction models;

combine the subset of performance prediction models into a composite prediction model;

load the composite prediction model into a model processor for scoring against the data stream of performance metrics to obtain a performance prediction for the technology landscape based thereon;

determine, from the data stream of performance metrics, a context change within the technology landscape that results in an updated data stream of performance metrics;

execute the model control file to select an updated subset of performance predication models from the plurality of performance prediction models, based on the context change and on the at least one correlation, including adding at least one of the plurality of performance prediction models to the subset of performance prediction models and/or removing at least one of the subset of performance prediction models;

update the composite prediction model within the model processor with an updated composite prediction model that includes the updated subset of performance prediction models; and load the updated composite prediction model into the model processor for scoring against the updated data stream of performance metrics to obtain an updated performance prediction for the technology landscape based thereon.

2. The computer program product of claim 1, wherein each performance prediction model in the composite prediction model has a relative importance determined from the model control file.

3. The computer program product of claim 1, wherein the instructions, when executed, are further configured to cause the at least one computing device to:

select the subset of performance prediction models based on detection of performance metric values of the performance metrics within the data stream of performance metrics.

4. The computer program product of claim 1, wherein the instructions, when executed, are further configured to cause the at least one computing device to:

determine that the context change includes an addition, removal, or update of a component, and at least one associated performance metric, within the technology landscape.

5. The computer program product of claim 1, wherein the instructions, when executed, are further configured to cause the at least one computing device to:

detect a new correlation between a first performance prediction model and a second performance prediction model of the subset of performance prediction models
with respect to the performance prediction; and
update the first performance prediction model and the
second performance prediction model to include the
new correlation.

6. The computer program product of claim 1, wherein the instructions, when executed, are further configured to cause the at least one computing device to:
remove a performance prediction model from the composite prediction model, based on an absence of corresponding performance metric values within the data stream of performance metrics.

7. The computer program product of claim 1, wherein the instructions, when executed, are further configured to cause the at least one computing device to:
detect a performance metric within the data stream of performance metrics for which no performance prediction model is included within the plurality of performance prediction models;
train a new performance prediction model, based on the detected performance metric; and
load the new performance prediction model into the model processor for inclusion within the composite prediction model.

8. A computer-implemented method, the method comprising:
receiving a data stream of performance metrics characterizing a technology landscape, the performance metrics being a subset of available performance metrics;
converting model description data describing a plurality of performance prediction models into a model control file including consumable code that indexes the plurality of performance prediction models with respect to the available performance metrics and with respect to at least one correlation between two or more of the available performance metrics;
executing the model control file to select, from the plurality of performance prediction models and based on the performance metrics and on the at least one correlation, a subset of performance prediction models;
combining the subset of performance prediction models into a composite prediction model;
loading the composite prediction model into a model processor for scoring against the data stream of performance metrics to obtain a performance prediction for the technology landscape based thereon;
determining, from the data stream of performance metrics, a context change within the technology landscape that results in an updated data stream of performance metrics;
executing the model control file to select an updated subset of performance predication models from the plurality of performance prediction models, based on the context change and on the at least one correlation, including adding at least one of the plurality of performance prediction models to the subset of performance prediction models and/or removing at least one of the subset of performance prediction models;
updating the composite prediction model within the model processor with an updated composite prediction model that includes the updated subset of performance prediction models; and
loading the updated composite prediction model into the model processor for scoring against the updated data stream of performance metrics to obtain an updated performance prediction for the technology landscape based thereon.

9. The method of claim 8, wherein each performance prediction model in the composite prediction model has a relative importance determined from the model control file.

10. The method of claim 8, further comprising:
selecting the subset of performance prediction models based on detection of performance metric values of the performance metrics within the data stream of performance metrics.

11. The method of claim 8, further comprising:
detecting a new correlation between a first performance prediction model and a second performance prediction model of the subset of performance prediction models with respect to the performance prediction; and
updating the first performance prediction model and the second performance prediction model to include the new correlation.

12. A system comprising:
at least one memory including instructions; and
at least one processor that is operably coupled to the at least one memory and that is arranged and configured to execute instructions that, when executed, cause the at least one processor to
receive a data stream of performance metrics characterizing a technology landscape, the performance metrics being a subset of available performance metrics;
convert model description data describing a plurality of performance prediction models into a model control file including consumable code that indexes the plurality of performance prediction models with respect to the available performance metrics and with respect to at least one correlation between two or more of the available performance metrics;
execute the model control file to select, from the plurality of performance prediction models and based on the performance metrics and on the at least one correlation, a subset of performance prediction models;
combine the subset of performance prediction models into a composite prediction model;
load the composite prediction model into a model processor for scoring against the data stream of performance metrics to obtain a performance prediction for the technology landscape based thereon;
determine, from the data stream of performance metrics, a context change within the technology landscape that results in an updated data stream of performance metrics;
execute the model control file to select an updated subset of performance predication models from the plurality of performance prediction models, based on the context change and on the at least one correlation, including adding at least one of the plurality of performance prediction models to the subset of performance prediction models and/or removing at least one of the subset of performance prediction models;
update the composite prediction model within the model processor with an updated composite prediction model that includes the updated subset of performance prediction models; and
load the updated composite prediction model into the model processor for scoring against the updated data stream of performance metrics to obtain an updated performance prediction for the technology landscape based thereon.

13. The system of claim 12, wherein the system is further configured to:
- select the subset of performance prediction models based on detection of performance metric values of the performance metrics within the data stream of performance metrics.

14. The system of claim 12, wherein the system is further configured to:
- detect a new correlation between a first performance prediction model and a second performance prediction model of the subset of performance prediction models with respect to the performance prediction; and
- update the first performance prediction model and the second performance prediction model to include the new correlation.

* * * * *

UNITED STATES PATENT AND TRADEMARK OFFICE
CERTIFICATE OF CORRECTION

PATENT NO. : 12,288,137 B2  
APPLICATION NO. : 16/949477  
DATED : April 29, 2025  
INVENTOR(S) : Slinger et al.

Page 1 of 1

It is certified that error appears in the above-identified patent and that said Letters Patent is hereby corrected as shown below:

In the Claims

In Column 20, Claim 1, Line 29, delete "predication" and insert -- prediction --, therefor.

In Column 21, Claim 8, Line 52, delete "predication" and insert -- prediction --, therefor.

In Column 22, Claim 12, Line 52, delete "predication" and insert -- prediction --, therefor.

Signed and Sealed this  
Fourteenth Day of October, 2025

John A. Squires  
*Director of the United States Patent and Trademark Office*